Jan. 23, 1934.  H. W. FISHER  1,944,639
TREATMENT OF HYDROCARBON MATERIALS CONTAINING SULPHUROUS IMPURITIES
Filed Nov. 20, 1929
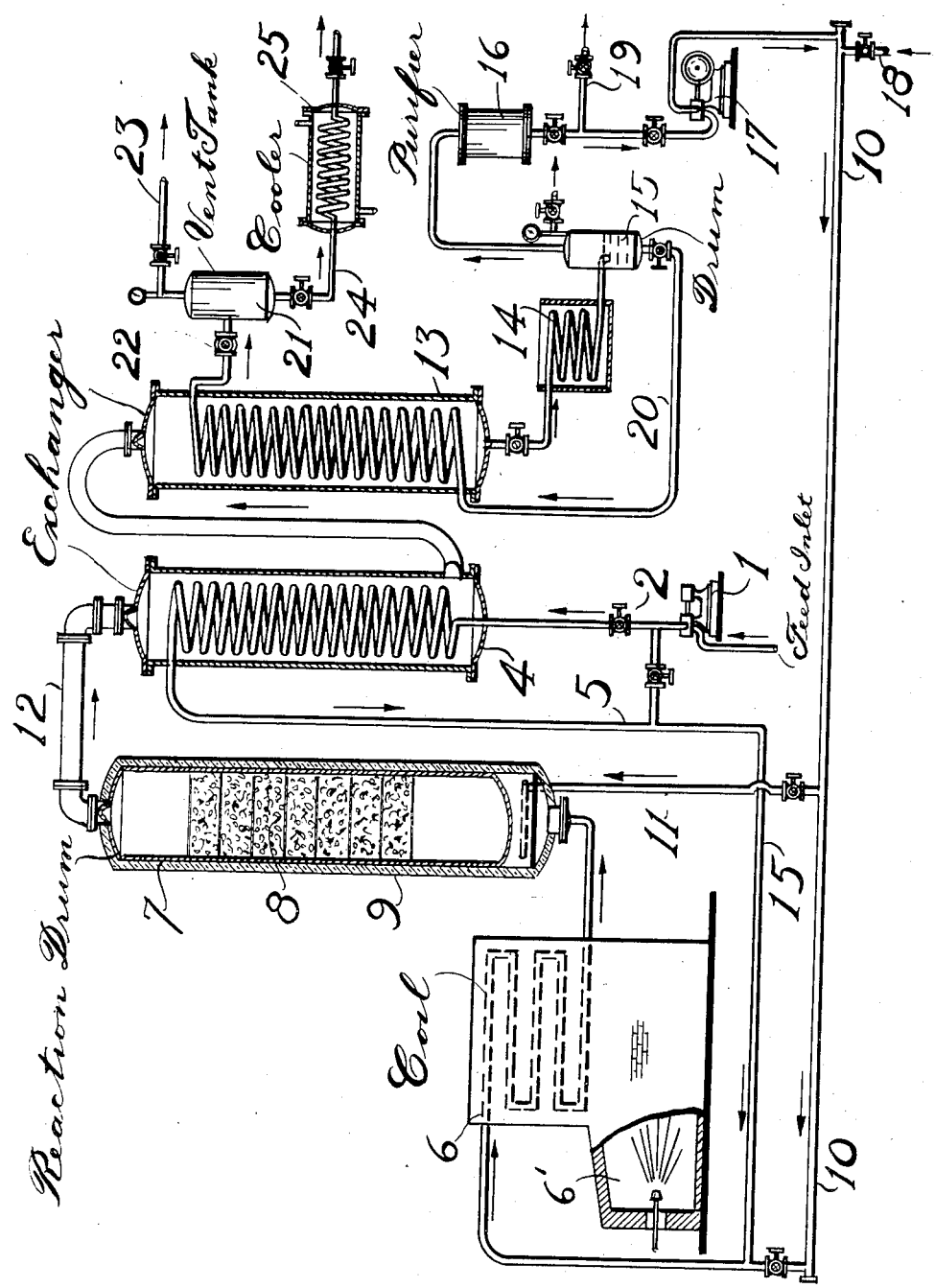
INVENTOR
Harold W. Fisher
BY
ATTORNEY Patented Jan. 23, 1934

1,944,639

UNITED STATES PATENT OFFICE 1,944,639

TREATMENT OF HYDROCARBON MATERIALS CONTAINING SULPHUROUS IMPURITIES

Harold W. Fisher, Elizabeth, N. J., assignor to Standard-I. G. Company

Application November 20, 1929
Serial No. 408,477

8 Claims. (Cl. 196—62)

The present invention relates to the manufacture of refined oils from unrefined hydrocarbon materials by the action of hydrogen under high pressure and at elevated temperatures. My invention will be fully understood from the following description and the drawing which illustrates one form of apparatus for carrying out my process.

The drawing is a semi-diagrammatic view in sectional elevation of an apparatus by which my process may be operated and indicates the flow of the various materials.

Referring to the drawing, the numeral 1 denotes a feed pump which forces oil under high pressure from any suitable source through a feed line 2, through heat exchanger 4 and thence by line 5 to the inlet of a suitable heating means 6 which may comprise a fired coil arranged in a furnace setting. The oil is raised to a high temperature and is discharged into a reaction drum 7 which may be packed with a suitable catalytic material 8. The drum is protected against loss of heat by suitable means, such as an insulating cover 9 and is adapted to withstand high pressure, temperature and the corrosive effect of oil and hydrogen.

A gas rich in free hydrogen is forced under high pressure from a manifold 10 into the inlet of coil 6 or into the drum by line 11 or preferably by both of the means simultaneously.

The reaction products find exit from the drum by line 12 flowing first through exchanger 4 and then through a second exchanger 13. The reaction products are further cooled in a water cooler 14 to substantially room temperature at which the material is discharged into a gas separation drum 15 which is preferably under substantially the same pressure as the reaction vessel.

The gas evolved from drum 15 comprises largely hydrogen with a small quantity of hydrocarbon gas and a smaller quantity of hydrogen sulphide. This gas is purified in a purifier 16 which may comprise a washing stage in which hydrocarbon oil is used under pressure. Purified gas is then compressed by booster pump 17 and returned to manifold 10. Fresh gas may be added by line 18 and gas may be flushed from the system by line 19.

The oil in drum 15 containing hydrogen sulphide is withdrawn by line 20 and is reheated by passage through exchanger 13. It is then discharged into a vent tank 21 after a substantial reduction of pressure at expansion valve 22. The vented gas is removed by line 23 and the oil substantially free of hydrogen sulphide is removed by line 24, cooled in cooler 25 and run to storage (not shown).

In the operation of the process of destructive hydrogenation of heavy oils to produce viscous oils and lighter products, I have noted that a large proportion of the sulphur originally in the oil, either in the form of free or combined sulphur is converted to hydrogen sulphide which is soluble in the oil to an appreciable degree at elevated pressure. It has also been found that the hydrogen sulphide should be removed from hydrogenated oils particularly oils intended for high grade lubricants before contact with the air. It is also desirable to recirculate the hydrogen gas since it must be used in large excess over that actually reacting with the oil and by my improved process it is possible not only to remove the hydrogen sulphide from the oil with substantial completeness but also to remove the major quantity from the recirculated gas.

The oil is heated in passage through coil 6 to a temperature preferably in excess of about 800° F. so that without additional heating of drum 7 its temperature may be maintained between about 750 and 870° F. Hydrogen pressure is in excess of about 20 atmospheres and preferably it should be about 100 or 200 atmospheres or higher. Catalysts such as metallic oxides are suitable, for example the oxides of molybdenum, chromium, tungsten and the like either alone or admixed with each other or with oxides of alkali, alkaline earth, rare earths, aluminum, zinc and similar metals. These materials are preferably packed into the drums in lump form.

The reaction products leaving the first exchanger are at the temperature in the neighborhood of 400° F. and are cooled by passage through the second exchanger 13 to as low a temperature as practicable. Further cooling is desirable with water or other low temperature medium so as to reach a temperature at which the major portion of the sulphurous impurities are in the liquid phase. Ordinarily cooling to 150° F. is sufficient but it is desirable to cool even below 100° F. pressure being maintained at substantially that of reaction drum 7, undiminished except for frictional losses. The gas vented is largely hydrogen with some hydrocarbon constituent and a smaller quantity of hydrogen sulphide. This gas may be circulated as such to the hydrogenation oven with addition of fresh or make up hydrogen but it is sometimes desirable to wash it first with oil to remove most of the hydrocarbons. The liquid which contains the major quantity of hydrogen sulphide, hydrocarbon gas and some hydrogen is reheated, preferably by passage through exchanger 13 and is discharged into a vent tank under substantially lower pressure. It is usually preferable to reheat to about 250° F. and to reduce pressure to approximately atmospheric pressure but pressures above atmospheric may be maintained, but a proportionately higher temperature should then be used. When vent tank 21 is held under vacuum by a suitable vacuum pump (not shown in the drawing), the oil need not be heated to so high a temperature. Vent tanks 15 and 21 may be replaced by separation means of any preferred type, such as stripping towers, well known in the art, without departing from the spirit of my invention. The gas evolved from tank 21 or its equivalent is largely composed of hydrogen sulphide, hydrocarbons and hydrogen. It may contain some light low boiling liquid hydrocarbons which can be obtained by compression and cooling or similar well known recovery means. The oil is substantially free of hydrogen sulphide and after cooling is run to storage. No soda treatment is necessary therefore to remove hydrogen sulphide if the temperature and pressure conditions prevailing in drum 21 are carefully chosen, depending on the concentration of the hydrogen sulphide and the character of the oil.

My invention is not to be limited by any theory of the mechanism of the process nor to any illustrative example of the means of accomplishing my purpose nor to other details of its operation but it is to be limited only by the following claims in which I wish to claim all novelty inherent in the invention.

I claim:

1. In the hydrogenation of heavy sulphur-containing hydrocarbon oils under high pressures and at elevated temperatures, the method of separating hydrogen sulphide and other volatile sulphurous compounds from the hydrogenated products which comprises withdrawing a mixture of hydrogenating gases and normally liquid hydrogenated oils from a hydrogenation zone, cooling said mixture under high pressure, separating the uncondensed gases and liquid products at said pressure, reheating the liquid products and reducing pressure thereon to vaporize volatile sulphurous compounds dissolved in said liquid without substantial vaporization of said liquid, and separating the vapor from the heated liquid.

2. Process for obtaining valuable lubricating oils substantially free of hydrogen sulphide and other volatile sulphurous compounds from heavy sulphur-containing hydrocarbon oils which comprises subjecting such heavy oils to the action of hydrogen under pressure in excess of 20 atmospheres at temperatures between about 750 and 870° F. and in the presence of catalytic materials, cooling the hydrogenated products and hydrogenating gases under substantially full pressure, separating the uncondensed gases and liquid products at said pressure, reheating the liquid products and reducing pressure thereon to vaporize volatile sulphurous compounds dissolved in said liquid without substantial vaporization of said liquid, and separating the vapor from the heated liquid.

3. Process according to claim 2 in which hydrogenation is accomplished under about 200 atmospheres pressure, the products are cooled under the same pressure to below about 150° F., the condensate after removal of uncondensed gas is reheated to a temperature above about 250° F., and the pressure on the reheated condensate is reduced to about atmospheric.

4. Process according to claim 1, in which the hydrogenated products are cooled under pressure to a temperature at which the major quantity of the sulphurous products are in the condensate.

5. Process according to claim 1, in which the hydrogenated products containing sulphurous impurities are cooled below about 150° F.

6. In a process for the destructive hydrogenation of sulphur-containing materials at pressures above about 20 atmospheres the method of removing hydrogen sulphide and other volatile sulphur compounds from the product which comprises withdrawing a mixture of products comprising hydrogenating gas and normally liquid hydrogenated oil, cooling the mixture under substantially full pressure to a temperature low enough to insure solubility of the greater part of the volatile sulphur compounds in the liquid oils, withdrawing a hydrogen gas low in sulphur, then separately reheating the liquid to a moderate temperature and reducing pressure thereon to vaporize the greater part of the volatile sulphur compounds, and separating the vapor from the unvaporized liquid.

7. Process for obtaining valuable lubricating oils substantially free of hydrogen sulphide and other volatile sulphurous compounds from heavy sulphur-containing hydrocarbon oils, which comprises subjecting such heavy oils to the action of hydrogen under pressure in excess of 20 atmospheres at temperatures between about 750 and 870° F. and in the presence of catalytic materials, cooling the resulting mixture of gases and normally liquid products under the same pressure to below about 150° F., separating the uncondensed gases and liquid products at said pressure, recirculating the uncondensed gases to the hydrogenation step, reheating the said separated liquid products to a temperature above 250° F. by interchange of heat with the hot hydrogenated products, reducing the pressure to about atmospheric to vaporize volatile sulphurous compounds dissolved in said liquid products and separating the resulting vapor from the heated liquid.

8. In a process for the destructive hydrogenation of sulphur-containing hydrocarbon materials at pressures above about 20 atmospheres, the method of removing hydrogen sulphide from the mixture of gases and normally liquid products obtained by said process, which comprises cooling said mixture under substantially full pressure to a temperature low enough to condense the normally liquid oils and to insure solubility of the greater part of the hydrogen sulphide in said liquid oils, separating the uncondensed gases from said oil, then separately reheating said oil to a moderate temperature and reducing pressure thereon to vaporize the greater part of the dissolved hydrogen sulphide without substantial vaporization of said oil, and separating the vapor from the unvaporized liquid.

HAROLD W. FISHER.